No. 855,089. PATENTED MAY 28, 1907.
D. E. BONATHAN.
COMBINED DISH AND DRIP PAN.
APPLICATION FILED MAY 1, 1906.
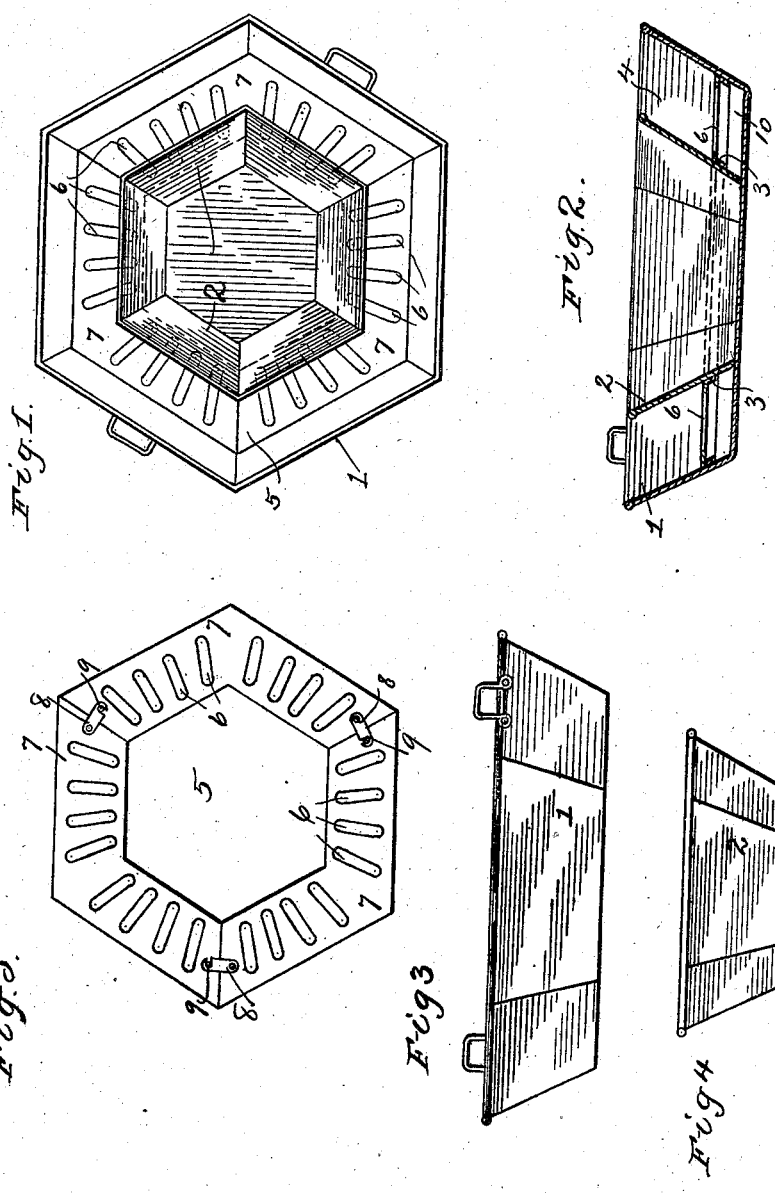

UNITED STATES PATENT OFFICE.

DAVID E. BONATHAN, OF LAKE LINDEN, MICHIGAN.

COMBINED DISH AND DRIP PAN.

No. 855,089.  Specification of Letters Patent.  Patented May 28, 1907.

Application filed May 1, 1906. Serial No. 314,645.

*To all whom it may concern:*

Be it known that I, DAVID E. BONATHAN, a citizen of the United States, residing at Lake Linden, in the county of Houghton and State of Michigan, have invented certain new and useful Improvements in a Combined Dish and Drip Pan, of which the following is a specification.

This invention relates to new and useful improvements in dish pans and the like and contemplates a novel structure embodying a combined receptacle for washing the dishes and a receptacle for draining the water from the dishes.

The primary object of the present invention is to provide means whereby the dishes may be easily dried, and the water drained therefrom suitably disposed of until the pan is cleaned.

In connection with the above means it is a consideration to provide a pan of the type set forth in which the draining appurtenances may be removed for the purposes of cleansing.

The invention finally aims to provide a device which in addition to the above named functions may be employed as a cooling receptacle, in which one of the compartments forms a storage chamber and the other compartment a chamber for the refrigerating medium.

The detailed construction will appear in the course of the following description, reference being had to the accompanying drawings forming a part of this specification, like numerals designating like parts throughout the several views, wherein, Figure 1 is a top plan view, illustrating a dish pan constructed in accordance with my invention, Fig. 2 is a vertical central section thereof, Fig. 3 is a side elevation of one receptacle, Fig. 4 is a side elevation of the inner receptacle, and Fig. 5 is a top plan view illustrating in detail the construction of the draining plates.

In the practical embodiment of my invention I employ an outer receptacle 1 and an inner open ended receptacle 2 soldered at its lower edge to the receptacle 1. These receptacles are arranged in spaced concentric relation and are of the same contour and depth. They may be of any shape desired, but in the preferred embodiment are hexagonal in form to facilitate a more advantageous arrangement of the dishes for draining purposes.

The pans 1 and 2 are each provided with rings 3 secured respectively upon the inner and outer surfaces thereof, in order to afford a support in the space 4 between said pans for the drain plate 5. This plate may be foraminous material or it may be of sheet material provided with openings 6 therein. The plate 5 is composed of a plurality of separable sections 7 which in their assembled relation are co-extensive with the space 4 and of the same contour as the pans 1 and 2, in order that the plate 5 may easily be fitted into the space 4. The sections 7 are severally provided with hooks or catches 8 at one end thereof which engage pins 9 upon the adjacent end of the opposing section to maintain said sections in their assembled relation.

The dishes after being washed in the pan 2 when the structure is assembled as shown in Fig. 2, are placed endwise in the space 4 and the water drained therefrom through the opening 6 in the plate 5 into a space 10 beneath said plate and between the pans 1 and 2. The plate 5 may be removed by simply lifting the same from the space between the receptacles 1 and 2 and the sections 7 thereof disassembled as desired.

If desired the space 4 may be used as a compartment for a refrigerating agent and the pan 1 may be used to contain perishable goods to be cooled by the refrigerant in the space 4. In either function the space 10 serves as a drip chamber.

It is obvious that various minor changes may be made without departing from the spirit and scope of my invention as defined in the appended claims.

Having fully described my invention I claim.

A device of the type set forth comprising an outer receptacle, an inner receptacle arranged in spaced concentric relation thereto but without communication therewith, a drain plate interposed as a dish support in the space between said receptacles and embodying perforate sections and means for detachably engaging said sections with one another.

In testimony whereof I affix my signature in presence of two witnesses.

DAVID E. BONATHAN.

Witnesses:
  EMIL F. PRINCE,
  IRVING TRACTEN.